United States Patent [19]

Gibbs, III et al.

[11] Patent Number: 4,721,239
[45] Date of Patent: Jan. 26, 1988

[54] BRACKET ASSEMBLY FOR AUTOMOBILE RACKS

[75] Inventors: Samuel C. Gibbs, III; Bradley S. Bishop; James B. O'Brien, all of Los Altos, Calif.

[73] Assignee: Konakorp, Oakland, Calif.

[21] Appl. No.: 888,819

[22] Filed: Jul. 22, 1986

[51] Int. Cl.⁴ .............................................. B60R 9/00
[52] U.S. Cl. ............................ 224/322; 224/42.45 R; 224/331; 224/326
[58] Field of Search ............... 296/213, 37.7; 224/329, 224/273, 331, 326, 330, 309, 322, 42.42, 42.45 R, 45.45 R

[56] References Cited

U.S. PATENT DOCUMENTS

| | | |
|---|---|---|
| 2,807,398 | 9/1957 | Mathews .......................... 224/331 X |
| 3,325,067 | 6/1967 | Helm . |
| 3,731,967 | 5/1973 | Hughes .............................. 296/1 R |
| 3,917,136 | 11/1975 | Carson . |
| 4,270,681 | 6/1981 | Ingram ............................. 224/321 |
| 4,358,037 | 11/1982 | Heideman .......................... 224/321 |
| 4,410,211 | 10/1983 | Kloppe et al. ..................... 296/213 |
| 4,473,178 | 9/1984 | Bott ................................... 224/324 |

Primary Examiner—Henry J. Recla
Assistant Examiner—David Voorhees
Attorney, Agent, or Firm—Glen R. Grunewald; Thomas R. Lampe

[57] ABSTRACT

A bracket assembly for supporting detachable, roof-top automotive, carrying racks of the type usually secured to vehicle rain gutters is disclosed. The bracket assembly may be used on vehicles having no rain gutters and includes a bracket plate member having a generally planar portion and a flange portion which is formed to have a generally W-shaped cross section that extends away from the planar portion for releasable coupling of rack mounting assembly thereto. The shape of the flange allows the bracket assembly to be used to anchor a roof-top rack to either a side wall or the roof of a vehicle.

4 Claims, 6 Drawing Figures

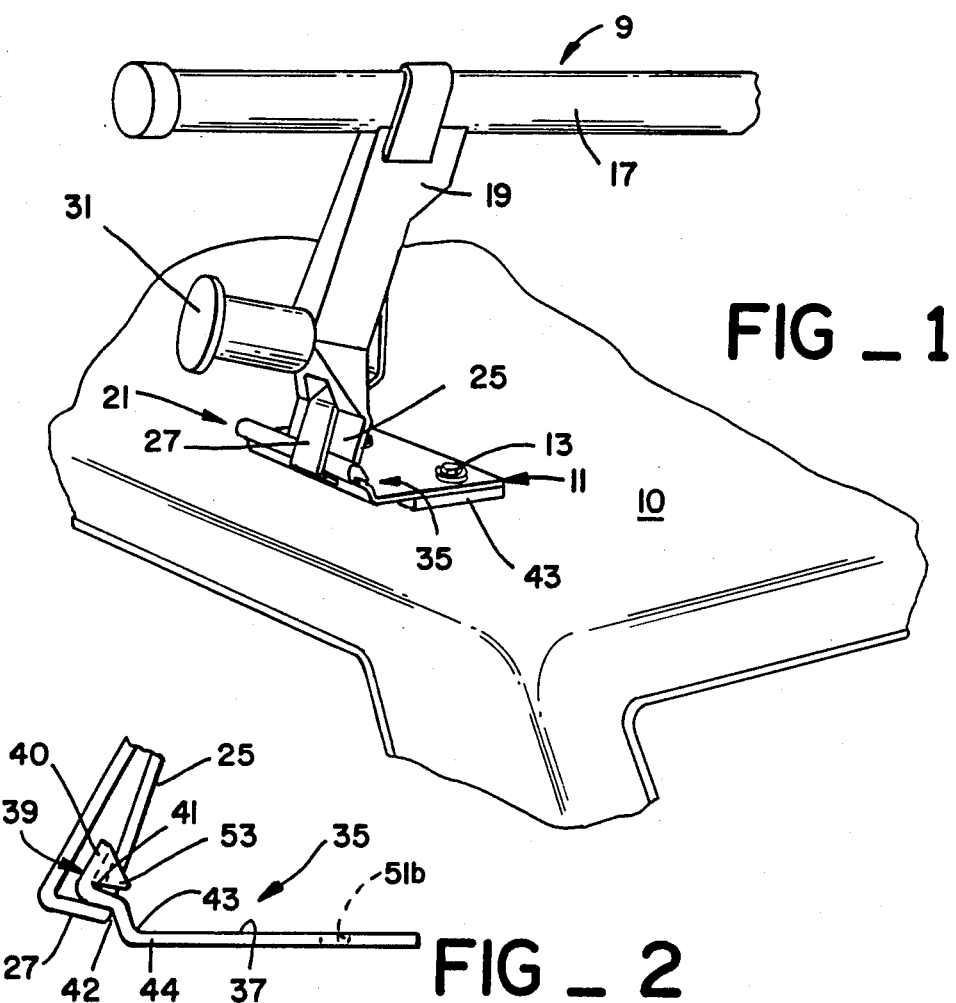
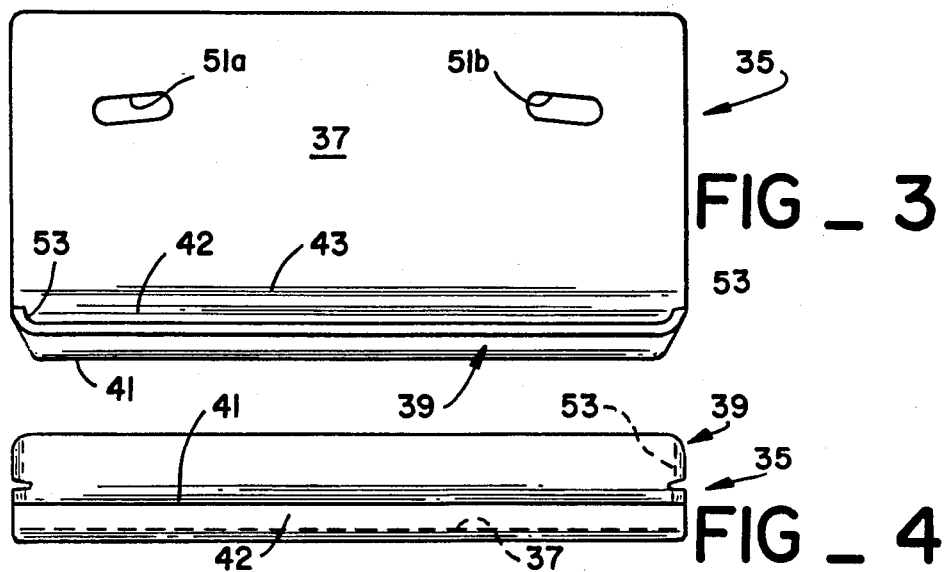

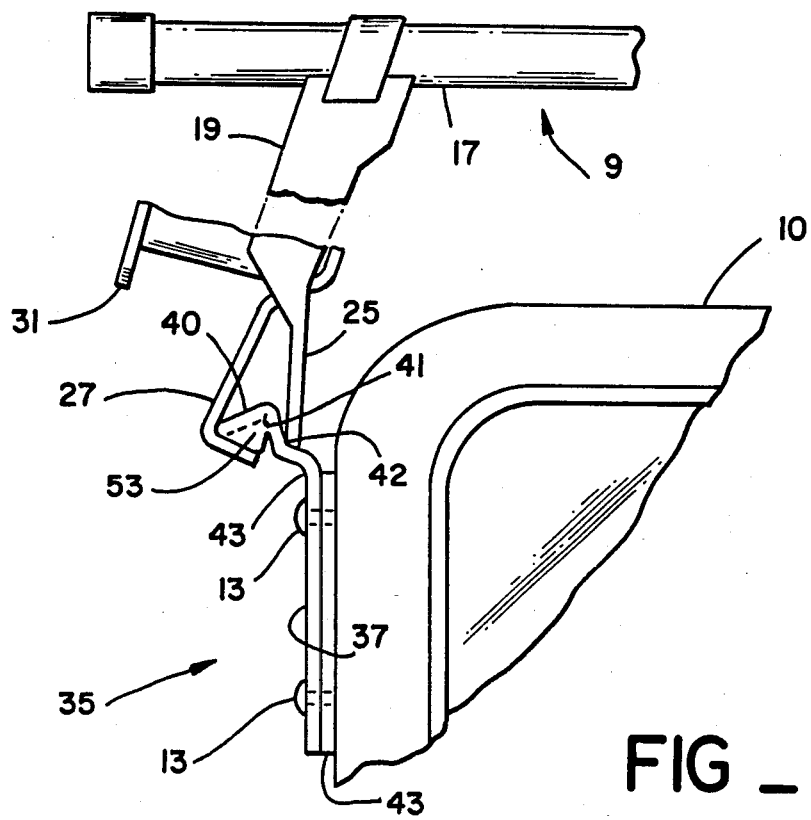
FIG_5
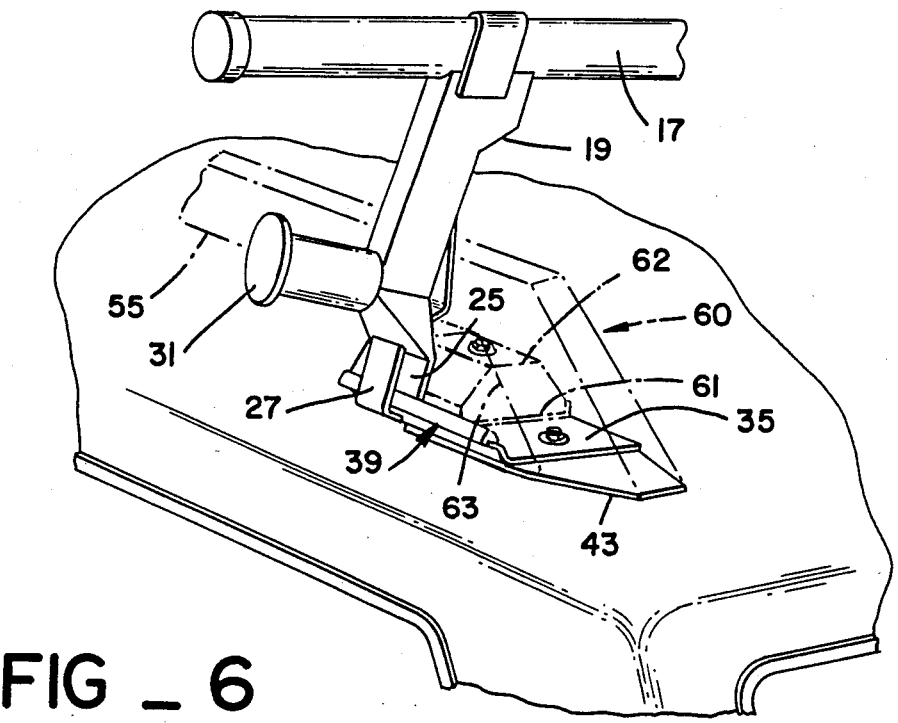
FIG_6

BRACKET ASSEMBLY FOR AUTOMOBILE RACKS

FIELD OF THE INVENTION

The present invention relates, in general, to racks for carrying articles on the roofs of automotive vehicles and, more particularly, to mounting brackets for use with detachable roof racks.

STATE OF THE ART

It is becoming increasingly common for automotive vehicle owners to utilize detachable roof racks for special duty carriage of recreational items such as skiing equipment, board sailing outfits, bicycles and the like. Typically such racks extend transversely across the roof of the vehicle several inches above the roof surface.

It is especially important that roof racks be securely attached to vehicles. This is not only critical to the protection of articles carried on racks, but also to the safety of motorists who could be endangered if a rack should accidentally release.

In the prior art, securement of detachable roof racks has been accomplished by providing adjustable clamps on the racks for clamping to rain gutter channels typically provided on a vehicle. For example, U.S. Pat. No. 3,325,067 for "Car Top Luggage Carrier" suggests, in connection with FIG. 14, using a mounting strap device including a J-shaped hook for fastening to a rain gutter on an automobile.

The dangers inherent in attaching roof racks to rain gutters on vehicles are recognized in U.S. Pat. No. 3,917,136 for a "Vehicle Rack Mounting Means." This patent suggests that gutter rail reinforcement plates should be secured on the sides of vehicles to support the rain gutter in the area of the roof rack mounting assembly. The reinforcement plate disclosed in the patent has a J-shaped lip which abuttingly extends along the side of the rain gutter. The rack mounting assembly includes an enlarged J-hook to engage the J-shaped lip on the reinforcement plate. According to the patent, such an assembly reduces stress concentrations applied to gutter rails and to reinforcement plates. Further, according to the patent, the rack mounting brackets include foot plates which rest either upon upper surfaces of the gutter rail or the reinforcement plate.

Recently, rain gutter channels have been eliminated on various models and styles of vehicles, and a trend toward gutterless vehicles appears to be underway. Vehicles without rain gutters are sometimes described as having aircraft type doors, presumably because of their aerodynamic design. Without rain gutters, it is more difficult to safely affix racks to the roofs of the vehicles.

One manner in which to mount roof racks to a vehicle without rain gutters is to stretch spring-biased straps across the roof and to provide hook-like members on the ends of the straps to grasp the edges between the inner part of the door frames on the sides of the vehicle. Although workable in some instances, such hook-like members can interfere with opening and closing vehicle doors and may cause wear of the seals between the doors and the door frames, thus allowing water leakage and increasing the noise level in the passenger compartment. Moreover, for two-door vehicles, there is no means to attach the rear set of hooks.

Another approach is shown in U.S. Pat. No. 4,410,211 in which an attempt is made to hide the rain gutter by a plate assembly, which plate assembly also will accept a roof rack mount.

Many vehicles are also factory-equipped with roof luggage carriers. Typically such luggage carriers are comprised of rails which extend lengthwise along the roof of a vehicle a few inches about the roof surface. Although such luggage carriers may be sufficient for some purposes, they do not provide sufficient support for certain articles and do not conveniently accommodate items which must be mounted lengthwise, rather than transversely, on a roof. For example, such luggage carriers do not readily accommodate sailboards. Another shortcoming of original-equipment, roof-top luggage carriers is that they are mounted low to the roof line and thus provide little clearance for articles having portions which project downwardly when mounted to the luggage carrier. For instance, it is difficult to attach bicycles to such factory-installed luggage carriers without damaging the roof of the vehicle.

As an alternative to fastening roof racks to rain gutters on vehicles, workers in the art have suggested fastening racks directly to the roofs of vehicles. For example, U.S. Pat. No. 3,731,967 suggests utilizing universal mounting devices for attaching a walkway to the roof of a truck cab; according to the patent, upright legs on mounting brackets for the walkway are bolted directly to the roof of the cab. As another example, U.S. Pat. No. 4,358,037 suggests permanently attaching spaced-apart roll-formed slats longitudinally to the roof a vehicle and providing external tracks on the slats to slidably receive brackets for a rack having cross bars which extend transversely across the roof. An analogous example of the prior art is U.S. Pat. No. 4,473,178 which discloses a rack system having a pair of elongated slats permanently affixed to the roof of a vehicle to support specially designed cross slats. According to this patent, the elongated slats are bolted directly to the roof. Yet another example of the prior art is U.S. Pat. No. 4,270,681, which teaches slats affixed directly to a vehicle roof; the slats provide tracks for slidably supporting brackets for crossbar-type racks.

OBJECTS AND SUMMARY OF THE INVENTION

A primary object and advantage of the present invention is to provide a bracket assembly to mount a roof rack to extend transversely across the roof of a vehicle without rain gutters and which accommodates vehicles having factory-installed, roof luggage racks (i.e., racks which extend lengthwise across the vehicle roof) as well as vehicles without such luggage racks.

In summary, the present invention generally provides a bracket assembly for mounting to a rack for supporting articles above the roof of an automotive vehicle wherein the rack is of the type having a mounting assembly with supporting legs and generally J-shaped hook members adjustably connected to the supporting legs. More particularly, the present invention provides a bracket plate assembly for anchoring the roof rack mounting legs selectively to either the roof or side of an automotive vehicle. The bracket plate assembly of the present invention includes a planar anchor plate having a flanged edge portion which extends away from the planar portion. The edge portion of the plate has a generally W-shaped configuration when viewed in transverse cross-section to permit either side or top mounting of the bracket.

Further objects and advantages of the present invention may be ascertained by those skilled in the art from the following description and appended drawings, which are offered by way of example of the preferred embodiment of the present invention.

BRIEF DESCRIPTION OF THE DRAWINGS

FIG. 1 is a top perspective view of a mounting bracket constructed in accordance with the present invention, mounted upon the roof of a vehicle, and having a roof rack mounted thereto;

FIG. 2 is an enlarged, end view of the bracket of FIG. 1;

FIG. 3 is a top plan view of the bracket of FIG. 2;

FIG. 4 is a side elevation view of the mounting plate of FIGS. 2 and 3;

FIG. 5 is a top perspective view of the mounting bracket of FIG. 1 shown mounted to a vehicle roof having a factory-installed luggage rack, shown by phantom lines, mounted and extending lengthwise of the roof; and FIG. 6 is an end elevation view of the mounting bracket of FIG. 1 affixed to a vehicle in a side-mounted position.

DETAILED DESCRIPTION OF THE PREFERRED EMBODIMENT

FIG. 1 generally shows a roof rack 9 of the type which extends transversely across the roof 10 of a vehicle and which is releasably attached to a bracket plate assembly 11 affixed to roof 10 by bolts 13. Roof rack 9, apart from the present bracket plate assembly 11, is a conventional rack of the type that is designed for mounting on vehicles with rain gutters, i.e., on vehicles without aircraft type doors. As such, roof rack 9 includes a crossbar member 17, a generally upright supporting leg 19 fixed at one end to crossbar 17, and an adjustable mounting assembly or clamping system 21 mounted to the opposite end of supporting leg 19. More particularly, the adjustable clamping system 21 includes a fixed foot 25 which extends at a slight angle from vertical to engage a rain gutter or channel. Further, the adjustable clamping system includes an adjustably movable J-shaped hook member 27 and means 31 to adjust its position relative to foot plate 25. In conventional use, not shown in the drawings, hook member 27 is positioned on the underside of the vehicle rain gutter to clamp foot plate 25 against the sidewall of a rain gutter. Hook 27 is drawn up against the vehicle rain gutter or is tightened in place by mechanism 31. In the embodiment illustrated in FIG. 1, the vehicle does not have a rain gutter and, instead, J-shaped hook member 27 is affixed to a bracket plate assembly 11 constructed according to the present invention.

A critical component of bracket plate assembly 11 is an anchor plate 35, whose structure can best be understood from FIGS. 2 through 4. Particularly, anchor plate 35 includes a planar plate portion 37 having an upturned flange or edge section 39 shaped to have a generally W-shaped cross section (FIG. 2) which extends away from planar portion 37. As best shown in FIG. 2, W-shaped flange 39 has a first to outboard leg 40, a first apex 41, a middle apex 42, a third apex 43, and a second leg 44 integral to planar plate portion 37. Formed through planar plate portion 37 are a pair of elongated apertures 51a and 51b. In practice, apertures 51a and 51b are preferably shaped and positioned to be in registry with roof holes provided to accommodate standard luggage carriers on various vehicles, such as the General Motors Chevy S-10 Blazers (1986 Model). However, precise placement and sizing of apertures 51a and 51b is a matter of design choice.

Bracket plate assembly 11 preferably further includes a planar pad member 43 (FIG. 1) dimensioned to be generally coextensive with planar plate portion 37 of anchor plate 35. In practice, pad member 43 is formed of flexible, resilient material such as neoprene rubber, but other materials can be used so long as they provide a relatively soft, non-marring surface. Pad member 43 also includes apertures (not shown) formed therethrough in registry with apertures 51a and 51b in planar plate portion 37 of anchor plate 35.

As also shown in FIGS. 3 and 4, tabs 53 can be formed at the ends of outboard leg 40 of flange 39. The tabs 53 function to inhibit movement fore and aft along flange 39 when a rack is clamped to flange 39, as will be described hereinafter in detail.

Installation and operation of bracket plate assembly 11 of FIGS. 1 through 4 can now be readily understood. As a first step, apertures 51a and 51b in planar plate portion 37 of anchor plate 35 are placed in registry with apertures in the roof of a vehicle with pad member 43 interposed between the roof and bracket plate 35 to prevent marring of the roof as well as to provide cushioning. In some instances, such roof holes are already available; if not, such holes must be formed. In practice, we have found it convenient to drill roof holes and then to utilize conventional blind fastening means, such as threaded metal inserts sold under the trademark NUTSERT by Aerpat A.G., to mount bracket plate 35 flush with the vehicle roof. Normally, pad member 43 is interposed between the roof and bracket plate 35 to prevent marring of the roof as well as to provide cushioning.

In the embodiment shown in FIG. 1, anchor plate assembly 11 is mounted such that W-shaped flange 39 is positioned outboard of roof 10. In effect, W-shaped flange 39 provides a false rain gutter to which roof rack 9 can be mounted. For purposes of installation, J-shaped hook member 27 on rack 9 is mounted outboard of W-shaped flange 39 to engage the backside of first apex 41 with the end of the J-shaped hook bearing against second apex 42 of the flange. Fixed foot plate 25 extends inboard of hook member 27 to seat on the flange between first apex 41 and second apex 42 of W-shaped flange 39. With the J-shaped hook member 27 and foot plate 25 thusly positioned, mechanism 31 is operated to draw J-shaped hook member 27 against the end of plate 25, thereby clamping rack 9 to bracket plate assembly 11 with both J-shaped hook member 27 simultaneously in contact with flange 39. As so mounted, the entire weight of rack 9 and any load placed thereon can be supported by the bracket assembly. The final assembly is rigid and more secure than if rack 9 had been fastened to an ordinary rain gutter.

For use with vehicles having factory-installed roof luggage carriers which extend lengthwise, bracket plate assembly 11 can be mounted in the same apertures that are used for attachment of the roof luggage carrier. FIG. 5 shows just such an arrangement, with luggage carrier 60 being shown in phantom. The factory-installed luggage carrier includes a mounting gasket 61 and a support block 62 which can be used with bracket assembly 11. It should be noted that factory-installed luggage racks 60 are not designed to withstand significant vertical loads. Accordingly, it is not advisable to clamp roof racks directly to such factory-installed racks.

It is a feature of the present invention, however, that bracket assembly 11 can be used with factory-installed luggage racks to provide a high-strength structure to which a roof rack ca be coupled while still allowing the factory-installed rack to remain in place for use. Installation of the present bracket is accomplished by removing rack 60, and placing pad 43 and plate 35 under mounting gasket 61 and leg 63 of rack 60. Mounting block 62 can be positioned under rail 55 in advance of leg 63, and a long mounting bolt passed through mounting block 62, gasket 61, plate 35 and pad 43 to bolt the entire assembly to the vehicle roof. This high-strength plate 35 and stress-distributing pad 43 assembly provide a roof rack bracket which can be used to support a roof rack and a substantial load, when luggage rack 60 would not be capable of performing such a function.

An important feature of the bracket assembly of the present invention is that bracket assembly 11 can be mounting at various locations and orientations on a vehicle while still providing support for a carrier rack without requiring modification of the rack or bracket. To illustrate this feature, FIG. 6 shows bracket assembly 11 connected vertically to a side wall of a vehicle, rather than horizontally to the roof.

In the orientation of FIG. 6, flange 39 is inverted from FIG. 2 and presents a generally M-shaped profile for attachment of rack 9. In the completed assembly, J-shaped hook 27 parallels and engages the interior of first leg 40 and first apex 41 of flange 39, while foot plate 25 seats in the second apex 42 of the flange. Here again, the final assembly is rigid and more secure than if rack 9 had been fastened to an ordinary rain gutter.

Although the present invention has been described with particular reference to the illustrated preferred embodiments, such disclosure should not be interpreted as limiting. Various alterations and modifications will no doubt become apparent to those skilled in the art after having read the preceding disclosure. In view of such variations and others, it is intended that the appended claims be interpreted as covering all alternative embodiments and equivalents as fall within the spirit and scope of the present invention.

What is claimed is:

1. An automobile roof rack system including a bracket plate assembly fastened to a selected one of a side wall and a roof of an automobile, and a roof rack formed for the support of articles thereon and having a rack mounting assembly thereon including hook means releasably coupled to said bracket plate assembly, wherein the improvement in said roof rack system comprises:

said bracket plate assembly including a bracket plate having a generally planar surface fastened in parallel relation to said selected one of said side wall and said roof, said bracket plate having a flange portion extending laterally from said planar surface in a direction away from said vehicle, and said flange portion having a W-shaped transverse cross section for coupling of said rack mounting means to one set of surfaces on said flange portion when said bracket plate is fastened to said roof and coupling of said rack mounting means to another set of surfaces on said flange portion when said bracket plate is turned end-for-end and fastened to said side wall.

2. An improvement according to claim 1 wherein, said rack mounting assembly includes a movable J-shaped hook member and a plate member; and said bracket plate is mounted to the roof of a vehicle and positioned such that said J-shaped hook member engages a backside of a first apex of said flange portion, and said plate member seats proximate a front side of said first apex of said flange portion.

3. An improvement according to claim 1, and stop means mounted at the ends of said W-shaped flange to prevent movement of said rack mounting assembly along said flange portion.

4. An improvement according to claim 1 wherein, said rack mounting assembly includes a movable J-shaped hook member and a plate member; and said bracket plate is mounted to said side wall of said vehicle, and is positioned such that the J-shaped hook member engages the front side of a first leg of said flange portion and said plate member seats proximate a back side of a second apex of said flange portion.

* * * * *